United States Patent [19]
Lu et al.

[11] Patent Number: 4,756,748
[45] Date of Patent: Jul. 12, 1988

[54] PROCESSES FOR THE SMELTING REDUCTION OF SMELTABLE MATERIALS

[75] Inventors: Wei-Kao Lu; Czeslaw Bryk, both of Hamilton, Canada

[73] Assignee: Canadian Patents and Development Limited—Société Canadian des Breves et d'Exploitation Limitée, Ottawa, Canada

[21] Appl. No.: 33,367

[22] Filed: Apr. 2, 1987

Related U.S. Application Data

[63] Continuation-in-part of Ser. No. 685,501, Dec. 24, 1984, abandoned.

[51] Int. Cl.$^4$ .................... C21B 13/12; C22B 23/00
[52] U.S. Cl. .................... 75/38; 75/10.19; 75/10.22; 75/40; 75/82
[58] Field of Search .................... 75/38, 40, 82, 10.19, 75/10.22

[56] References Cited

U.S. PATENT DOCUMENTS

| | | | |
|---|---|---|---|
| 1,459,187 | 6/1923 | Pratt | 75/40 |
| 2,413,434 | 12/1946 | Cottrell | 263/29 |
| 2,526,658 | 10/1950 | Harman et al. | 75/38 |
| 2,603,561 | 7/1952 | Swann | 75/40 |
| 2,805,930 | 9/1957 | Udy . | |
| 2,823,108 | 2/1958 | Gerlach | 75/33 |
| 2,889,219 | 6/1959 | Halley . | |
| 2,907,651 | 10/1959 | Black . | |
| 2,973,306 | 2/1961 | Chick et al. | 202/21 |
| 3,340,044 | 9/1967 | MacAfee et al. | 75/38 |
| 3,689,251 | 9/1972 | Goss | 75/40 |
| 3,753,682 | 8/1973 | Kohl . | |
| 3,895,936 | 7/1975 | Toepell | 75/36 |
| 4,073,641 | 2/1978 | Montanteme et al. | 75/82 |
| 4,123,332 | 10/1978 | Rotter | 201/15 |
| 4,179,278 | 12/1979 | Beggs et al. . | |
| 4,217,175 | 8/1980 | Reilly | 202/118 |
| 4,380,469 | 4/1983 | Sulzbacher | 75/38 |
| 4,464,197 | 8/1984 | Calderon | 75/37 |
| 4,483,257 | 11/1984 | den Otter | 110/218 |

FOREIGN PATENT DOCUMENTS

| | | |
|---|---|---|
| 387576 | 12/1923 | Fed. Rep. of Germany . |
| 381007 | 12/1923 | Fed. Rep. of Germany . |
| 2153717 | 10/1971 | Fed. Rep. of Germany . |
| 972449 | 3/1941 | France . |

*Primary Examiner*—Melvyn J. Andrews
*Attorney, Agent, or Firm*—Rogers & Scott

[57] ABSTRACT

A process for the smelting reduction of oxide ores, in particular iron ores, employs a mixture of the finely divided ore with equally finely divided reductant, which in the case of iron ores preferably is a coal. The mixture is fed into the interior of a heated tubular reaction vessel and moved positively through a heated reaction zone by a screw conveyor embedded in the charge. The conveyor breaks away any accretions that stick to the wall before they can build to a size that will stall the conveyor. The particles are in the range 75-1400 micrometers with a preferred size of at least 95% less than 600 micrometers, and the preferred ratio of ore to reductant is in the range of ratios 18:82 to 30:70. The reduced iron can be fed directly into a melting furnace for separation of metal and non-metal, it can be powdered and separated magnetically or it can be briquetted. Multiple screw conveyors can be used to move multiple charges and the process can be used with nickel ores and in the production of metallurgical coke.

13 Claims, 3 Drawing Sheets

PROCESSES FOR THE SMELTING REDUCTION OF SMELTABLE MATERIALS

CROSS-REFERENCE TO RELATED APPLICATION

This application is a continuation-in-part of our prior application Ser. No. 06/685,501, filed Dec. 24, 1984 now abandoned.

FIELD OF THE INVENTION

This invention is concerned with processes and apparatus for the smelting reduction of smeltable materials using heat and reducing material that is mixed with the material, and especially but not exclusively, to processes and apparatus for the smelting reduction of iron ores using heat and carbonaceous reducing material. The smelting reduction of low grade silicate nickel ore by the process has been successfully carried out.

REVIEW OF THE PRIOR ART

Processes for the direct reduction of smeltable material have been known from ancient times and are now usually defined as any process in which metal is produced by reduction from a corresponding ore without using a blast furnace. Smelting reduction means that the metal produced passes through the liquid state. The most important commercial direct reduction processes which produce sponge iron are for the production of metallic iron from iron oxide, whether in the form of naturally-occurring ores and/or the various waste smeltable materials (e.g. dusts) that are available, using any one or more of natural gas, coke-oven gas or coal as the reducing agent. Current interest in non-blast furnace reduction processes has been based upon the potentially lower capital investment and more flexible operating conditions, because of the fact that sinter plants, coke oven plants, blast furnaces and pelletization plants are all expensive to build and to operate. A smelting reduction plant using fine ore (direct from the concentrator without agglomeration) and like smeltable materials and powder coal can replace all four major equipment components in the conventional process to provide liquid iron from ore and coal.

A comprehensive review of direct reduction processes and apparatus, including smelting reduction processes and the apparatus required, has been given in a report by Davis et al entitled "Direct-Reduction Technology and Economics" published in "Ironmaking and Steelmaking 1982", Vol. 9, No. 3, pages 93 to 129.

We are aware of one commercial process for smelting reduction at the present time, i.e. electric arc furnace reduction operation by Quebec Iron and Titanium Corp. in the Province of Quebec, Canada.

We are also aware of two processes which have been developed to pilot plant scale and subsequently abandoned. A Swedish process entitled DORED and similar to the KALDO steelmaking process failed because of excessive lining wear due to the use of iron oxide rich slags. An Italian development entitled ROTORED, used a cylindrical reactor which rotated in an upright position, the centrifugal force pushing the metal produced upwards along the lining to prevent the corrosive slags from contacting the lining. However, the same force also hinders the mixing which makes this process not commercially viable.

Three processes named respectively ELRED, INRED and PLASMASMELT are now being developed in Sweden and are reviewed in the article quoted above.

DEFINITION OF THE INVENTION

It is the principal object of the present invention to provide new processes for the smelting reduction of ores and the like, and new apparatus for carrying out such processes.

More specific objects are to provide such new processes and apparatus for the smelting reduction of iron ores to metallic iron and of silicate nickel ores to nickel or iron-nickel alloys.

In accordance with the present invention there is provided a new process for the direct smelting reduction of a metal from a smeltable material in an endothermic reaction by the use of heat and solid reducing material, the process including the steps of:

(a) mixing finely divided smeltable material to be reduced and finely divided solid reducing material in the proportions required for a mixed finely divided charge thereof;

(b) the smeltable material being of average particle size with at least 95% less than 600 micrometers, and the solid reducing material being of average particle size with at least 80% less than 600 micrometers;

(c) delivering said mixed finely divided charge in unreacted state to the interior of a tubular reactor vessel and moving the charge through the vessel interior by means of a screw type conveyor which is at least partly buried in the charge during the residence of the charge in the reactor vessel, so that the charge is both agitated and moved by the conveyor, which is protected against the effect of elevated temperature to which the charge is subjected for its direct reduction by the cooling effects of the endothermic reduction reaction of the charge and of the gases evolved during the reaction;

(d) applying heat to the charge within the tubular reactor vessel for a sufficient period of time and at a temperature in the range from about 1,100° C. to about 1,300° C. below and sufficiently close to the melting temperature such as to effect direct reduction of smeltable material in the reactor vessel to sponge of at least 48% by weight metallisation; and (e) discharging the sponge produced in the reaction vessel to a pool of liquid metal and slag and completing the reduction reaction in the said pool.

A partially metallized charge leaving the reactor vessel drops into a liquid pool, wherein melting and reduction of the residue oxides take place.

Also in accordance with the present invention there is provided apparatus for the smelting reduction of metal from ore thereof by use of heat and reducing material, the apparatus comprising:

(a) a reactor vessel comprising an elongated tubular container having a longitudinal axis having an inlet to its interior and an outlet therefrom;

(b) means for delivering a charge to be reduced to the said inlet for conveyance through the interior to the outlet;

(c) means for receiving a reduced charge from the said outlet;

(d) a screw conveyor having a longitudinal axis which is embedded in the charge with its longitudinal axis parallel to that of the vessel, the screw conveyor being rotated about its longitudinal axis to mix the charge and move it from the inlet to the outlet, and means for so rotating the screw conveyor within the interior; and (e) heating means for heating the charge within the reactor vessel interior to the temperature adequate for the reduction of the charge.

DESCRIPTION OF THE DRAWINGS

Processes and apparatus in accordance with the invention will now be described, by way of example, with reference to the accompanying schematic drawing wherein.

DESCRIPTION OF THE PREFERRED EMBODIMENTS

Figure 1:
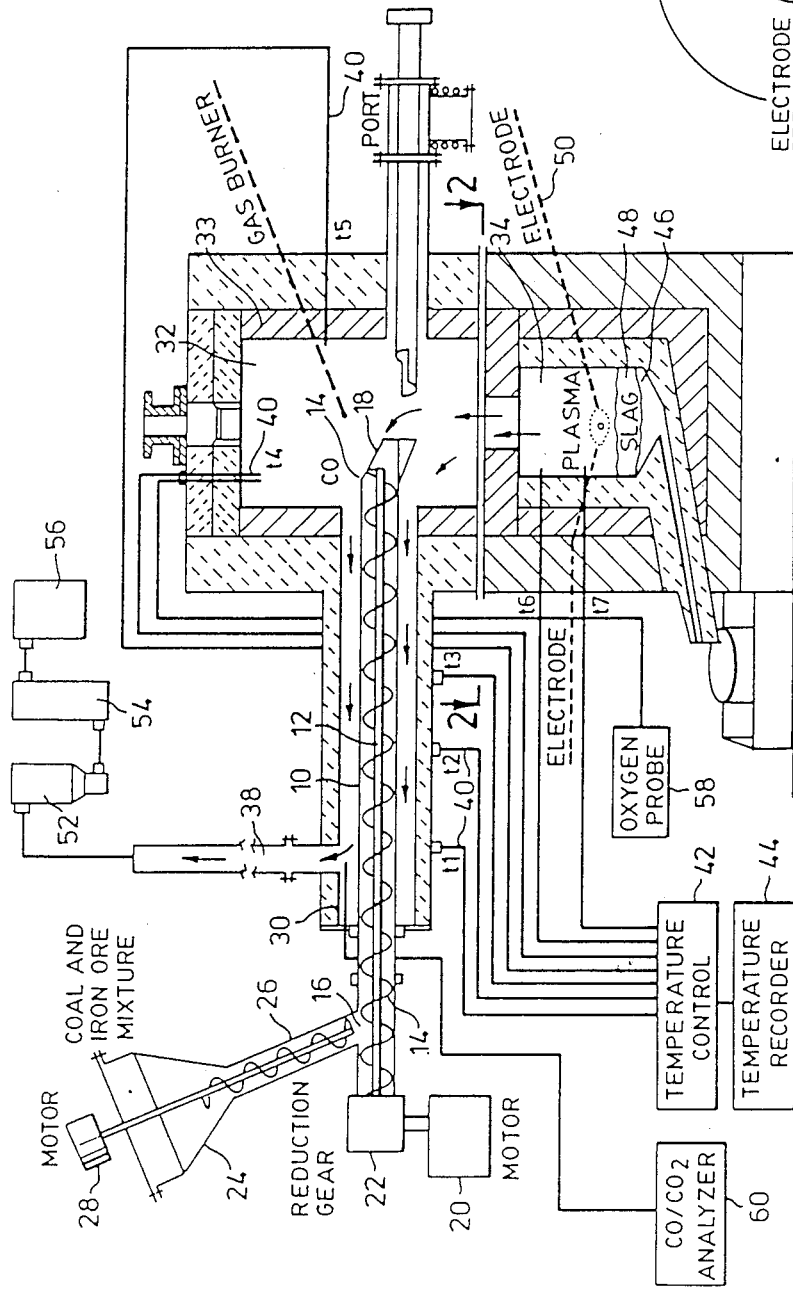
FIG. 1 is a diagrammatic represetnation of apparatus which is of an embodiment of the invention.
Figure 2:
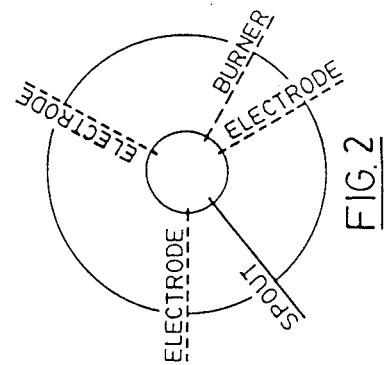
FIG. 2 is a horizontal section taken on line 2—2 of FIG. 1.

Referring now to FIG. 1 of the drawings apparatus for effecting smelting reduction of iron ore consists of an elongated tubular reactor vessel 10 of uniform circular cross-section along its length, the vessel having a longitudinal axis 12. The upper half of the tube at the discharging end is removed to improve the direct transfer of heat to the resulting sponge. A support 13 is located beneath the tube to prevent premature break-off of the sponge by gravity. An elongated metal screw conveyor 14 of external diameter only slightly smaller than the internal diameter of the tubular vessel is mounted in the interior of the tubular reactor and extends from an inlet 16 thereto to the other open end which constitutes outlet 18 therefrom. The conveyor is rotated about its respective longitudinal axis 20 by a motor 22 through the usual intermediate mechanism which need not be described in detail.

The pre-mixed mixture of finely divided materials constituting the furnace charge is stored in a hopper 24 from whence it is fed at a controlled rate and bulk density to the vessel interior by a conveyor screw 26 driven by a motor 28. The tube forming the vessel 10 is made of a refractory material able to withstand the temperatures and mechanical abrasion to which it is subjected in operation while having a sufficiently high heat transmission efficiency. A successful laboratory apparatus has used a tube of Mullite (Trade Mark) a low alloy steel while silicon carbide tubes are also suitable. Larger commercial apparatus will use a combination of these materials. At least part of the rector vessel 10 is placed inside an externally insulated preheating tube 30. The mixture of ore and coal is heated through the tube wall by the outgoing gases and by direct heating of the sponge by radiation and by convection at the outlet 18. Oxidation of part of the residual carbon in the sponge also generates some additional heat. The materials exiting from the outlet 18 discharge into a top chamber 38 from which they pass by gravity to a bottom chamber 46.

The reduction of metal oxides is a strong endothermic reaction. The heat required may be generated by the partial combustion of fuels, but natural gas is used in this embodiment for convenience, introduced by a gas burner indicated by broken line 46. In commercial operation coal is preferred for economy reasons. The fuel and air (or oxygen enriched air) are introduced, after mixing, into the top chamber 38 and result in combustion. The flame from the burner 46 also reacts with volatile matters which come out of outlet 18 to result in a more protective atmosphere for the sponge or coke. All or part of the gaseous products pass around reaction tube 10 as a heat source and leave the system at outlet 44. Thermocouples 32 are provided at intervals along the tube to determine the temperature of the exterior wall and to control the supply of heat via a controller 34, a recorder 35 also being provided.

The resulting reduced spongy metallic iron passes immediately into the lower chamber of the furnace 36 in which the iron and slag are melted quickly under reducing atmospheric conditions to form a metal pool 40 and superposed molten slag layer 42, which are tapped off as necessary. The source of heat for this melting operation can be by any conventional means, such as an arc struck between electrodes, electric induction, or by air- or oxygen-fed gas, oil or powder coal burners, the electrodes or burners being indicated at 46. The gaseous products that are generated within the reaction vessel 10 are partially burned in the top chamber 38 and around the reaction tube 10, while being drawn off continuously via outlet 44 and treated by any of the usual processes, illustrated herein by way of example as a dust separator 48, scrubbing tower 50 and storage gasometer 52.

In an alternative embodiment which is not specifically illustrated the mixture of spongy iron and slag from the outlet 18 is passed into a cooling unit in which it is cooled under reducing atmospheric conditions as quickly as possible to minimize the possibility of re-oxidation. The reduced mixture can be used in the similar ways as with all other direct reduction products.

There is adequate supply or iron ores in North America that are available in very finely divided form because beneficiation processes from low grade ore bodies are employed in almost all mines. The finely divided form is a disadvantage in using such ore in conventional direct reduction or blast furnace processes because agglomeration, namely sintering or pelletization, is necessary. In this invention, iron ore concentrates and like smeltable materials of suitable particle size may be used without further treatment and results in significant economic benefits.

The range of particle size preferred for the smeltable material in the processes of the invention is that it should be fine enough, i.e. 95% less than 600 micrometers. The processes of the invention permit the direct use of the commercial concentrates, perhaps directly at the mine site, or alternatively by transporting and handling the material in finely divided form.

The solid reducing material employed is finely powdered coal and the particular coals employed at the present time are characterised as high in volatiles and of high fluidity, which are the typical characteristics for coking coals. The reactivity of the coal and its volatile content increase together, but a high volatile content or coking property is not directly necessary in the practice of the invention. However, a high volatile coal has higher shrinkage during the reaction and this assists the escape of the resultant gases from the reacting material and their free flow from the reactor vessel. The ash content of the coal is not particularly important, although of course the lowest economically available ash content is preferred.

The coal must also be ground to finely divided state to have close and extensive contact with ore particles; in this particular embodiment the preferred size is 80% less than 600 micrometers. Care must of course be exercised in the handling of such finely divided, highly combustible material because of the possibility of rapid combustion, or even explosion. For reasons of safety the powdered coal may be stored wet, or if dry then under an inert atmosphere. Either type of coal may be mixed with a preheated ore up to about 400°–500° C. in a non-oxidising atmosphere using the combustible output gas from the reactor as the source of heat, to result in a pre-heated, pre-mixed reactor charge at a temperature of about 300° C.

The following Table 1 shows the results of a series of experiments using powdered coal of different average particle size. The mixtures employed consisted of 82% by weight iron ore concentrate (Adams mine) and 18% by weight Devco coal. The furnace was operated at a temperature of 1200° C. and at a horizontal conveyor speed of 1.5 r.p.m. to give a reaction time of about 2 minutes and a vertical feed conveyor speed of 1.0 r.p.m.

TABLE 1
The Effect of Particle Size on Coal

| Exp. # | Particle Size μm | Fe Total (Fe$_T$) % | Fe Metallic (Fe$_M$) % | Fe$_m$/Fe$_T$ × 100 | FeO % | C % |
|---|---|---|---|---|---|---|
| A | 75 | 80.50 | 78.79 | 97.81 | 2.26 | 4.76 |
|  | 75 | 79.69 | 76.65 | 95.24 | 3.62 | 4.12 |
| B | 75–150 | 80.50 | 76.74 | 95.33 | 4.84 | 4.98 |
|  | 75–150 | 80.70 | 75.95 | 94.11 | 4.75 | 5.10 |
| C | 300–600 | 78.60 | 63.66 | 80.99 | 19.23 | 5.75 |
|  | 300–600 | 79.12 | 62.90 | 79.50 | 20.88 | 5.97 |
| D | 600–1400 | 78.13 | 60.72 | 77.72 | 22.38 | 6.45 |
|  | 600–1400 | 77.92 | 59.51 | 76.37 | 23.67 | 6.59 |

As is to be expected maximum metallisation is obtained with the smallest particle sizes less or equal to 75 micrometers; substantially the same degree of metallisation is obtained with particle sizes between 75 and 150 micrometers. An appreciable drop from about 95% to about 80% is obtained with particles in the range 300–600 micrometers, and another smaller drop to about 77% with particles in the range 600–1400 micrometers. Metallisation can be increased by longer reaction times requiring larger apparatus, or giving smaller throughput, and these disadvantages must be balanced against the additional grinding costs involved as the average particle size is decreased. It is for this reason that an ore particle size of 95% less than 600 micrometers is preferred for a commercial operation. It was also found with the larger size particles (above 600 micrometers) that difficulty developed in moving material through the reaction zone caused, it is believed, by segregation of the particles under the agitation to which they are subjected by the conveyor screw; such segregation is reduced or avoided if both components are of comparable particle size.

The preferred particle size of coals for the manufacture of metallurgical coke by the process and apparatus of the invention are Non-coking coal: 95% less than 600 micrometers
Coking coal: 80% less than 600 micrometers Another important parameter of the processes of the invention is the ratio of the ore to be reduced to the amount of solid reductant. It is found in practice that the minimum amount of a high volatile coal should be about 18% by weight; for iron ore concentrate of 68% iron, this amount gives the required metallisation and also gives sufficient carbon in the metal pool in the furnace 36. This carbon is necessary both to reduce the melting point of the metallic iron and also to protect the iron while in the spongy state against re-oxidation. Increasing the amount of coal from about 18–20% up to about 30% by weight does not substantially increase the amount of metallisation, but does increase the amount of carbon in the metal. The presence of a surplus of carbon above stoichiometric has a beneficial effect upon the gases produced in the process, in that the percentages of carbon monoxide and hydrogen are increased, making it more suitable as a chemical feed stock or clean fuel for subsequent processes.

Figure 3:
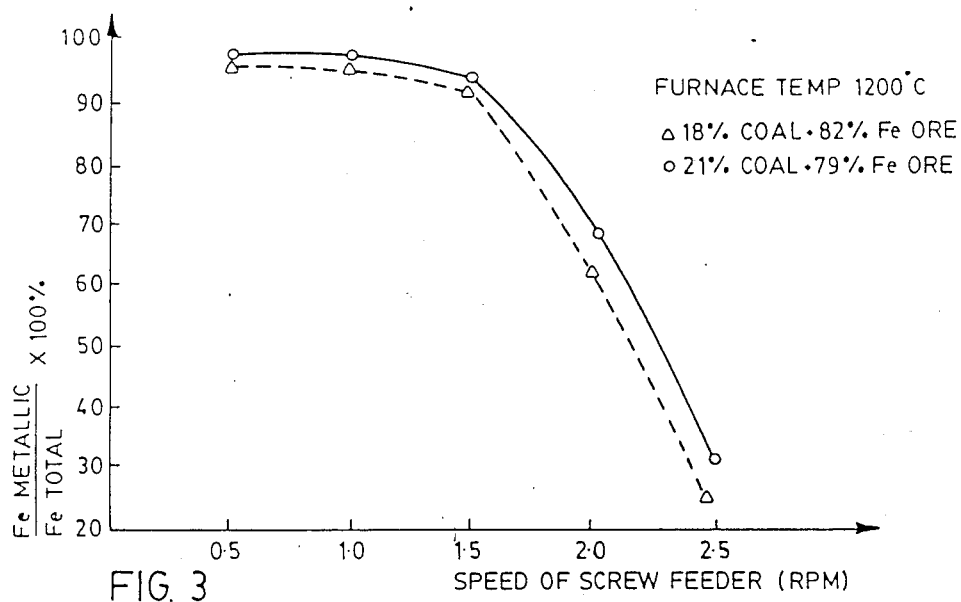
FIG. 3 is a graph showing the variation of metallisation of a charge with horizontal feed screw speed.
Figure 4:
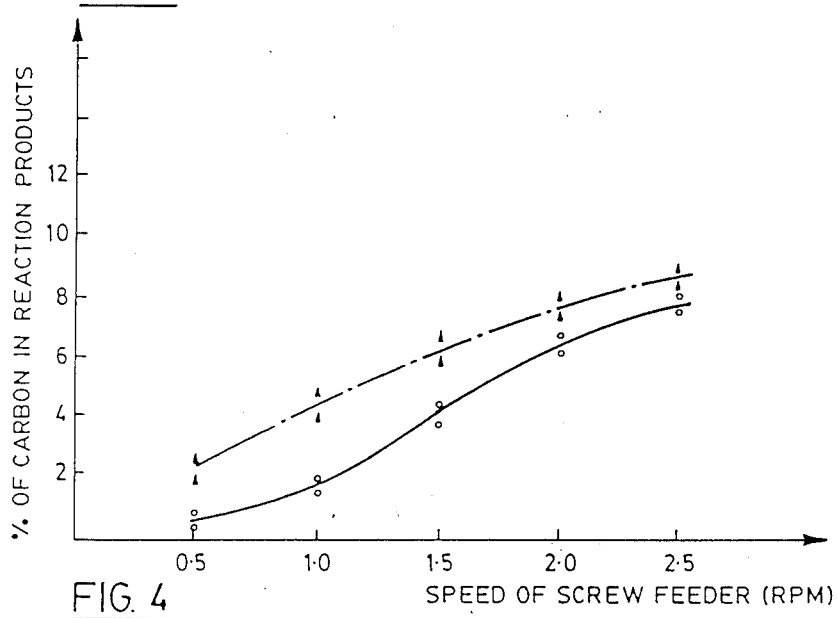
FIG. 4 is a graph showing residual carbon content in the reduced material with horizontal feed screw speed.

FIG. 3 shows inter alia the degree of metallisation obtained with two different mixtures of average particle size less than 75 micrometers treated with different residence times (increased conveyor speeds) in the reactor vessel at a temperature of about 1200° C. The solid line was obtained for a mixture of 21% by weight coal and 79% iron ore, while the broken line is for a mixture of 18% coal and 82% ore; the decrease in metallisation with the smaller proportion of coal is quite small and remains substantially constant. FIG. 4 shows that decreased residence time (increased conveyor speed) results in substantial increase in carbon content in the resultant reduced product, although again the difference between the two mixtures is substantially constant for different residence times. The mixture with the smaller amount of coal results in the smaller percentage of carbon in the reduced product.

It is preferable to employ a process which results in the minimum amount of slag, since this eases the handling problems and increases the output of the apparatus. It is an advantageous property of the processes that there is a high proportion of sulphur in the slags, with consequent reduction in the metal and in the output gases. Sufficient slag must be available to dissolve the sulphur for this beneficial effect to be obtained, and it may therefore, with some processes, be necessary to add slag-forming materials such as lime or limestone. Up to 5% by weight of lime may be added, or the equivalent weight of limestone (up to 7%).

All of the charge must reach a minimum temperature of about 1100° C. if reduction is to take place in the case for iron ore and nickel ore reduction. Increase of temperature will decrease the necessary reaction time for adequate metallisation and the upper limit is about 1350° C. if any substantial melting is not to take place in the vessel 10, and render the process inoperable. The preferred range of process temperature in the charge is from about 1150° C. to about 1300° C. The lower chamber 36 will of course operate at a higher temperature and the inner wall of the reaction vessel 10 will also be at a higher value. In this embodiment the screw conveyor 14 is of steel (with or without ceramic tip) and is therefore a heat sink by conduction along its length. As mentioned above, the reaction is quite highly endothermic and the heat flux must be sufficient to maintain the reaction temperature despite the resultant heat loss. There is also a substantial loss of heat to the by-product gases which contact the higher temperature walls of the vessel as they leave; in commercial processes as much as possible of this heat will be recovered by heat exchange in the cooling of the gases. The issuing gases are reducing with respect to the wustite/iron equilibrium at their actual temperatures, and the flow thereof appears to be strong enough and sufficiently well-distributed to protect the sponge iron produced from re-oxidation toward the open end of the reaction vessel, even in the presence of the strongly oxidising flame from the gas burner 46.

The constant consumption of heat by the furnace charge and heat transfer to the issuing reaction gases will result in a temperature gradient across the reacting mixture. The remaining reacting mixture is the most effective coolant for the conveyor screw to protect it against the elevated temperature. It is of course necessary to make the screw conveyor of materials that retain as much strength as possible at the high temperatures of operation, but there will be the usual compromises between initial and maintenance costs which will dictate whether it is possible to use more resistant, yet costly materials for the conveyor.

The charge of material entering the reactor vessel may be pre-heated as described above and will require some time to reach an effective reaction temperature, increasing the required residence time in the tube. The discharge end of reaction tube is partially cut open to increase the heat transfer rate and to decrease the residence time. Table 2 below shows the effect of vessel temperature on the metallisation of a mixture of 79% by weight iron ore and 21% by weight Devco coal of average particle size less than about 75 micrometers fed through the reaction vessel with a conveyor speed of 1.5 r.p.m. It will be seen that there is an abrupt increase in the degree of metallisation from 1150° C. to 1200° C. and a smaller increase to 1250° C. This abrupt increase is from an unsatisfactory value in experiment F (about 15%) to a satisfactory value in experiment G (about 48%). This parameter reflects the working condition of the reaction tube and determines the energy requirement in the melting zone. The table shows that 1200° C. is adequate but higher temperatures would be more satisfactory for improved and faster chemical reaction and reaction of larger particles provided that the reaction vessel and the conveyor screw can withstand the increased temperature. The required degree of metallization can be achieved by appropriate adjustment of temperature together with residence time in the reactor vessel, the mechanical conveyor structure permitting ready close control of the latter.

TABLE 2

| | The Effect of Furnace Temperature | | | | | |
|---|---|---|---|---|---|---|
| Exp. # | Furnace Temp °C. | $Fe_T$ % | $Fe_M$ % | $Fe_M/Fe_T \times 100$ | FeO % | $Fe_3O_4$ % | C % |
| E | 1050 | 60.45 | — | — | 37.12 | 43.59 | 11.91 |
| | 1050 | 61.20 | — | — | 40.50 | 43.51 | 11.49 |
| F | 1100 | 63.20 | 10.11 | 15.99 | 44.10 | 25.95 | 9.35 |
| | 1100 | 62.55 | 9.13 | 14.59 | 46.06 | 24.41 | 8.86 |
| G | 1150 | 69.40 | 32.85 | 47.33 | 41.57 | 5.81 | 6.90 |
| | 1150 | 68.69 | 33.10 | 48.18 | 38.45 | 5.72 | 6.75 |
| H | 1200 | 79.15 | 75.80 | 95.76 | 4.31 | — | 5.91 |
| | 1200 | 78.90 | 74.60 | 94.55 | 5.52 | — | 5.83 |
| I | 1250 | 83.14 | 82.49 | 99.22 | 0.83 | — | 4.25 |
| | 1250 | 83.05 | 82.07 | 98.82 | 1.25 | — | 4.67 |

Although natural gas and gases leaving the reaction tube are employed for heating the reaction vessel it will be apparent that other sources of heat can also be used, for example the combustion of some of the powdered coal, oil, etc., with pre-heating of the combustion air by heat exchange with the off gases. The overall fuel consumption is lower, since the chemical reaction of reduction takes place at relatively lower temperatures and results in carbon-rich iron of reduced melting temperature. Although the reaction and melting take place in separate zones they can be regarded as part of the same furnace and a single heat source can be used, such as a plasma arc or the combustion of powdered coal.

The required reaction time is, as described above, dependent upon the temperature of the reaction and the rate at which heat can be supplied to the charge. Assuming that the furnace is operated at a temperature high enough to supply heat at a sufficient rate, then the residence time for the charge within the reaction vessel will be adjusted to the minimum required for adequate metallisation, so as to obtain maximum output from apparatus of given size. The conveyor screw 14 requires to be somewhat smaller in external diameter than the internal diameter of the reaction vessel interior to provide an adequate passageway for the evolving gases which must escape from the vessel without the generation of unsafe pressures. It is also preferred for the longitudinal axis 20 of the conveyor screw to be displaced vertically downwards from the corresponding axis 12 of the tubular vessel, so that the screw is resting on the bottom of the vessel inner wall. The difference in size is not critical and the screw diameter should be in the range 93–97% of the vessel interior diameter.

The continuous operation of the screw 14 ensures that any accretions are broken away before they can grow to a size that will cause it to stall. The operation of the apparatus therefor differs fundamentally from that of a kiln or rotary hearth in which there is no positive mechanical means moving the charge through the reaction zone. The chemical reaction is also accompanied by shrinkage of the charge, which occurs progressively along the reaction vessel from the inlet to the outlet, and thus provides additional space for the evolving gases. The conveyor screw must extend at least to the cooler part of the reaction vessel interior beyond the zone at which the temperature is sufficient for an accretion to adhere to the vessel wall; in practice this means that it should protrude close to the outlet 18, and not beyond.

The linear velocity of the movement of material through the reaction zone, and the residence time of the material in the reaction zone is determined by the speed of rotation of the conveyor screw 20, which in this embodiment could be varied between 0.66 and 3 r.p.m. The hot zone had a length of 10 cm and these speeds therefore corresponded respectively to residence times of from about 3 minutes down to 40 seconds. The results shown in Tables 1, 2 and 3 were obtained for a vessel of 4.0 cm interior diameter. Longer residence times of 5 to 11.5 minutes were obtained with a larger vessel of 8.75 cm interior diameter, where rotation speeds were varied between 0.33 and 0.75 r.p.m. and where the hot zone had a length of 35 cm. Table 3 below shows the results of a series of experiments J through K with increasing furnace temperature and also with increasing conveyor speeds to give shorter reaction times. The rate with postscript H is for the horizontal conveyor 20, while that with the postscript V is for the feeder conveyor 26. As described above, variations in the speed of the vertical conveyor 26 will result in variations of the bulk densit of the charge.

TABLE 3

| Exp. # | Furnace Temp.°C | Coal Ore | Feeding Rate rpm | Reaction Product, % wt | | | | |
|---|---|---|---|---|---|---|---|---|
| | | | | $Fe_t$ | $Fe_m$ | FeO | C | S |
| J | 1170 | 21 | 0.66 H | 80.00 | 80.00 | — | 4.81 | 0.32 |
| | | 79 | 0.66 V | 80.50 | 80.50 | — | 4.86 | 0.31 |
| K | 1170 | 21 | 0.66 H | 75.29 | 75.0 | 0.37 | 6.17 | 0.32 |
| | | 79 | 2.5 V | 75.39 | 75.10 | 0.37 | 5.80 | 0.31 |
| L | 1200 | 18 | 1.0 H | 88.0 | 87.50 | 0.64 | 0.82 | 0.29 |
| | | 82 | 1.0 V | 88.4 | 88.00 | 0.51 | 0.92 | 0.29 |
| M | 1200 | 18 | 1.5 H | 80.0 | 80.0 | — | 4.05 | 0.29 |
| | | 82 | 1.5 V | 80.0 | 79.8 | 0.26 | 4.11 | 0.29 |
| N | 1240 | 18* | 2.0 H | 69.50 | 44.10 | 32.70 | 6.28 | 0.30 |
| | | 82 | 1.5 V | 69.92 | 45.55 | 31.30 | 6.17 | 0.30 |

Figure 5:
FIG. 5 shows diagrammatically the physical form taken by the reduced material from a reaction vessel before it is discharged into the melting furnace.

Comparison of the experiments J and K shows that the increased bulk density caused by increasing the rate of the feed conveyor 26 results in lower metallisation. The highest metallisation is shown by experiment L with temperature 1200° C. and medium conveyor speeds. The substantial drop with experiment N is explained only partly by the reduced reaction time, since a coarser grind of coal was used. A sketch of the physical form taken by the reduced material from experiment L is shown in FIG. 5 in which it is seen that the sponge is helical. All of the experiments were accompanied by relatively smooth operation of the conveyor.

Figure 6:
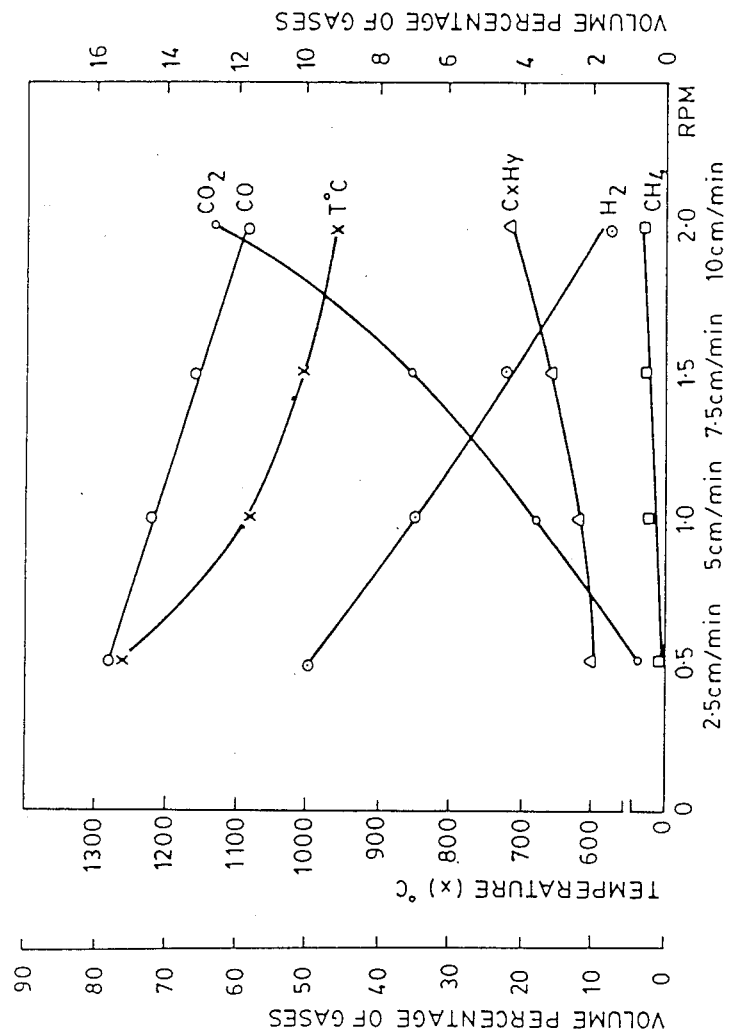
FIG. 6 is a graph showing the change in the composition of the output gases with screw feed speed.

FIG. 6 shows the effect of varying conveyor speeds on the chemical composition of the output gases. It will be seen that the lower speeds favour the production of carbon monoxide and hydrogen, while the higher speeds favour the production of carbon dioxide and hydrocarbons, accompanied by a temperature reduction, the choice being therefore also dependent upon the intended end-use of these gases.

There are a number of waste smeltable materials that are produced in the iron- and steel-making industry as the result of conventional iron- and steel-making operations which, because they are in the form of dusts and sludges, cannot successfully be recycled through the conventional processes and consequently must be discarded usually by dumping. Much of the prior art of agglomerating, pelletizing, balling, etc., of these materials has resulted from attempts to convert these materials to a physical form suitable for charging into conventional iron- and steel-making apparatus. Such dumping can cause severe environmental problems because of the fine nature of the dusts and the solid components of the sludges if they become dry, or the possibility of leaching of heavy metals into the adjacent ground water, and consequently are becoming subject to increasing by severe controls. The processes and apparatus of the present invention are able to process such dusts and sludges to produce significant metal outputs, operating either independently or in conjunction with an existing iron- and steel-making installation to employ the waste material therefrom. The materials are subject to the same size constraints as for virgin ores and are ground and sized as required.

Table 4 below gives a comparative analysis of a virgin iron ore concentrate (Adams concentrate) with the Basic Oxygen Furnace sludge (BOF sludge), the Blast Furnace sludge (BF sludge), the Blast Furnace stack dust (BF stack dust) of that facility, together with the dust of another steel-making facility (Atlas dust). Constituents of less than 1% content in all the examples are omitted for convenience.

TABLE 4

Chemical Analysis of Raw Materials Used for Iron Production

| | Adams Concentrate | BOF Sludge 100,000 T/Y | BF Sludge 100,000 T/Y | BF Stack Dust 32,000 T/Y | Atlas Dust |
|---|---|---|---|---|---|
| $Fe_{total}$ | 67.79 | 46.20 | 31.47 | 29.01 | 54.86 |
| $Fe_2O_3$ | — | 70.89 | 36.41 | 32.18 | — |
| FeO | — | — | 8.54 | 8.33 | 70.51 |
| CaO | 0.06 | 12.79 | 7.63 | 7.46 | 3.81 |
| MgO | 0.35 | 4.40 | 1.93 | 2.03 | 1.10 |
| $Al_2O_3$ | 0.35 | 0.19 | 1.61 | 1.71 | 0.20 |
| $SiO_2$ | 5.07 | 1.40 | 7.41 | 7.78 | 3.70 |
| $C_{total}$ | — | 3.87 | 34.80 | 37.54 | 1.16 |
| S | 0.01 | 0.17 | 0.69 | 0.65 | 2.79 |
| ZnO | — | 2.47 | 0.21 | 0.17 | 9.90 |
| MnO | 0.05 | 1.07 | 0.80 | 0.84 | 5.62 |
| $Cr_2O_3$ | — | — | — | — | 4.80 |
| L.O.I. | — | 9.8 | 34.7 | 33.5 | — |

Owing to the relatively low total iron of some of these waste materials, it will usually be preferred to blend those materials with ore of higher iron content to produce a more effective charge. Table 5 below shows the analysis of metal produced from two blends of dust with ore (D1 and D2), and from the Atlas dust alone, some of the smaller metal inclusions being omitted for convenience, from which it will be seen that excellent products are obtained.

TABLE 5

Chemical Analysis of Metal Products (%)

| Exp. # | Blend Composition (%) | Fe | C | Mn | Si | S | P | Pb | Cr | Cu |
|---|---|---|---|---|---|---|---|---|---|---|
| D-1 | 15% Kopperstone Coal 50% Dust Blend 35% Adams Ore | 96.8 | 1.28 | 0.09 | 0.20 | 0.79 | 0.03 | 0.010 | 0.02 | 0.006 |
| D-2 | 15% Kopperstone Coal 35% Dust Blend 50% Adams Ore | 97.1 | 1.35 | 0.07 | 0.11 | 0.98 | 0.04 | 0.010 | 0.02 | 0.002 |
| D-3 | 75% Atlas Dust 25% Kopperstone Coal | 88.0 | 1.48 | 2.90 | 1.0 | 0.34 | 0.11 | 0.018 | 4.20 | 0.47 |

Various modifications may be made to the apparatus hereinbefore described without departing from the scope of the invention. For example, the tube need not be cut away as shown in FIG. 1 however the preferred arrangement increases heat transfer and can increase speed of operation. Also the apparatus illustrated in FIG. 1 is exemplary and in an alternative structure multiple screw feeders are provided to a single chamber which can be heated by burning coal or other heating medium.

We claim:

1. A process for the direct smelting reduction of a metal from a smeltable material in an endothermic reaction by the use of heat and solid reducing material, the process including the steps of:
   (a) mixing finely divided smeltable material to be reduced and finely divided solid reducing material in the proportions required for a mixed finely divided charge thereof;
   (b) the smeltable material being of average particle size with at least 95% less than 600 micrometers, and the solid reducing material being of average particle size with at least 80% less than 600 micrometers;
   (c) delivering said mixed finely divided charge in unreacted state to the interior of a tubular reactor vessel and moving the charge through the vessel interior by means of a screw type conveyor which is at least partly buried in the charge during the residence of the charge in the reactor vessel, so that the charge is both agitated and moved by the conveyor, which is protected against the effect of elevated temperature to which the charge is subjected for its direct reduction by the cooling effects of the endothermic reduction reaction of the charge and of the gases evolved during the reaction;
   (d) applying heat to the charge within the tubular reactor vessel for a sufficient period of time and at a temperature in the range from about 1,100° C. to about 1,300° C. below and sufficiently close to the melting temperature such as to effect direct reduction of smeltable material in the reactor vessel to sponge of at least 48% by weight metallisation; and
   (e) discharging the sponge produced in the reaction vessel to a pool of liquid metal and slag and completing the reduction reaction in the said pool.

2. A process as claimed in claim 1, wherein the smeltable material to be reduced is an iron ore and the solid reducing material is a coal.

3. A process as claimed in claim 1, wherein the smeltable material to be reduced is a nickel ore and the solid reducing material is a coal.

4. A process as claimed in claim 1, wherein the smeltable material is a nickel ore of particle size in the range from about 75 micrometers to about 1400 micrometers.

5. A process as claimed in claim 2, wherein the finely divided ore consists of from about 70% to about 82% by weight of the mixture of ore and reducing material.

6. A process as claimed in claim 2, wherein the charge of ore and reducing material is in the reactor vessel interior for a period of time from 40 seconds to 11.5 minutes.

7. A process as claimed in claim 2, wherein the proportion of finely divided ore in the mixture is from about 70% to 82% by weight and the proportion of reducing material is respectively from about 30% to 18% by weight.

8. A process as claimed in claim 6, wherein the mixture includes a predetermined amount of finely divided flux-forming material to result in a fluid slag with adequate desulfurization power.

9. A process as claimed in claim 2, wherein the sponge produced in the reactor vessel is fed directly to a melting furnace in which the metal and resulting slag are melted for the separation thereof.

10. A process as claimed in claim 1, wherein a plurality of reactor vessels are provided feeding to a single pool of liquid metal and slag.

11. A process as claimed in claim 1, wherein the smeltable material comprises a blend of iron- or steel-making iron-containing waste material and virgin iron ore.

12. A process as claimed in claim 1, wherein the smeltable material comprises a blend of iron- or steel-making iron-containing dusts and virgin ore.

13. A process as claimed in claim 12, wherein the charge comprises from about 35% to about 50% by weight of iron-containing dusts and respectively from about 50% to about 35% by weight of virgin ore.

* * * * *